United States Patent [19]

Weisberg et al.

[11] 4,011,664
[45] Mar. 15, 1977

[54] SELF-CORRECTING ANSWER MACHINE
[75] Inventors: Myron D. Weisberg, Bergenfield; Selden Levy, Rivervale, both of N.J.
[73] Assignee: Vis-Quiz, Inc., New York, N.Y.
[22] Filed: Aug. 6, 1975
[21] Appl. No.: 602,276
[52] U.S. Cl. .............................................. 35/9 B
[51] Int. Cl.² ........................................ G09B 7/02
[58] Field of Search ........................... 35/9 B, 9 C
[56] References Cited
UNITED STATES PATENTS 2,507,215  5/1950  Miltenberg et al. ............... 35/9 C
3,298,115  1/1967  Dunn, Jr. ............................ 35/9 B
3,696,525  10/1972  Cleary ................................ 35/9 B Primary Examiner—William H. Grieb
Attorney, Agent, or Firm—Peter L. Berger

[57] ABSTRACT

A self-correcting answering machine is provided in which the user is presented with a series of questions having true or false answers. When the user indicates his choice, a right or wrong indication is provided so as to notify the user as to the correctness of his answer.

6 Claims, 4 Drawing Figures

SELF-CORRECTING ANSWER MACHINE

BACKGROUND OF THE INVENTION

This invention relates to a self-correcting answering machine, and more particularly, to such a machine which is suitable for use as a toy or educational game.

With the advent of new educational theories, many educators feel that one learns the most information when he has the ability to check himself without outside supervision. Thus, there has developed an area of expertise and interest in self-correcting answering devices.

One of the problems of such devices is their limited nature and scope, that is, the limited number of questions which are capable of being utilized with the machine. Further, the cost of such machines is generally prohibitive to be acceptable to the consumer, and is especially prohibitive for use by children as a toy or game.

These devices tend to be complex, unwieldy, sensitive and generally unsuited for use by a young child in the home. Further, the materials used in the construction of such machines generally lend towards their fragility, also tending to make them unavailable for home consumer use.

Recently, with the Bicentennial activity, a spate of interest has developed around American history. It is believed that when the questions relate to a specific object, such as a person or president, the visual display of that object enhances the learning process.

An object of this invention is to provide an inexpensive simple, durable, dependable self-correcting answering machine which is suitable for the home consumer market.

Another object of this invention is to provide such a machine which is suitable for use by children.

Yet another object of this invention is to provide such a machine which is attractive, portable and is provided with a visual display area for displaying an object about which questions are to be answered.

Other objects, advantages and features of this invention will become more apparent from the following description.

SUMMARY OF THE INVENTION

In accordance with the principles of this invention, the above objects are accomplished by providing a self-correcting answering machine formed of a housing, the housing generally being made of a molded plastic material. A viewing face is provided which includes a viewing window into which a slide is placed, the slide being illuminated when placed in the window. A circular question card is provided upon which is printed a series of questions, the circular card being cooperatively received by a rotary dial, the rotary dial being connected to a RIGHT-WRONG display means indicating that the user's choice of answer is either right or wrong. The circular card is provided with means which cooperate with the rotary dial such that the orientation of the card on the dial can only be one way. The dial, itself, is interconnected with a multiposition rotary switch, the rotary switch having a number of positions corresponding to the number of questions on the card.

Electric circuit means are provided so that the position of each switch and thus each answer on the card is predetermined as being TRUE or FALSE, so that a number of different cards can be used with the present machine. Further, the shaft upon which the multiposition switch is mounted is freely rotatable, so that there is no start or stop position, thus, making it difficult, if not impossible, for the user to ascertain the beginning point or the sequence of TRUE and FALSE positions on the rotary dial and the coupled multiposition switch.

DETAILED DESCRIPTION

Figure 1:
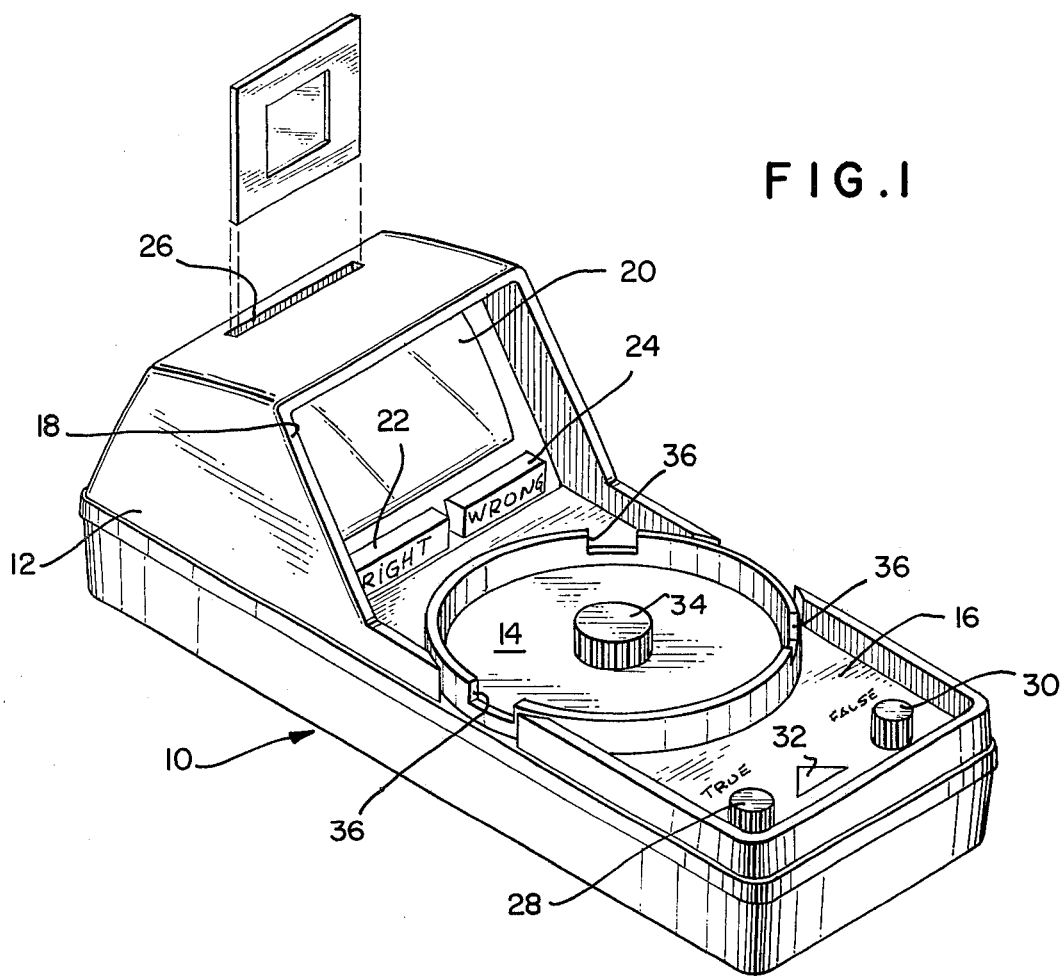
FIG. 1 is a perspective view of the answering machine of this invention.

Referring now to drawings, and in particular to FIG. 1, there is shown the answering machine 10 of this invention generally comprising a cabinet 12 formed of a plastic material generally molded. The housing could be formed of any other suitable material as desired. The housing is provided with a rotary dial 14 mounted upon a substantially horizontal face 16 of the machine, there being integrally provided with said horizontal face an upwardly sloped face 18 in which is mounted a viewer 20 and RIGHT and WRONG indicating areas 22 and 24 respectively. A slide viewer receiving means 26 is provided into which a side containing the object about which the questions are to be asked is inserted, with the viewer 20 being illuminated when the slide is in receptacle 26. The substantially horizontal face 16 has TRUE and FALSE push-button means 28 and 30 respectively in between which there is a designated arrow 32 pointing to the question to be answered by the user.

The rotary dial 14 is comprised of a knurled handle portion 34 and three spaced apart slots 36 located on the periphery of the rotary dial. The slots 36 are spaced apart from each other in an unique way such that cooperating projecting lugs from the question card (to be described hereinafter) can be seated on the rotary dial in only one spatial orientation.

Figure 3:
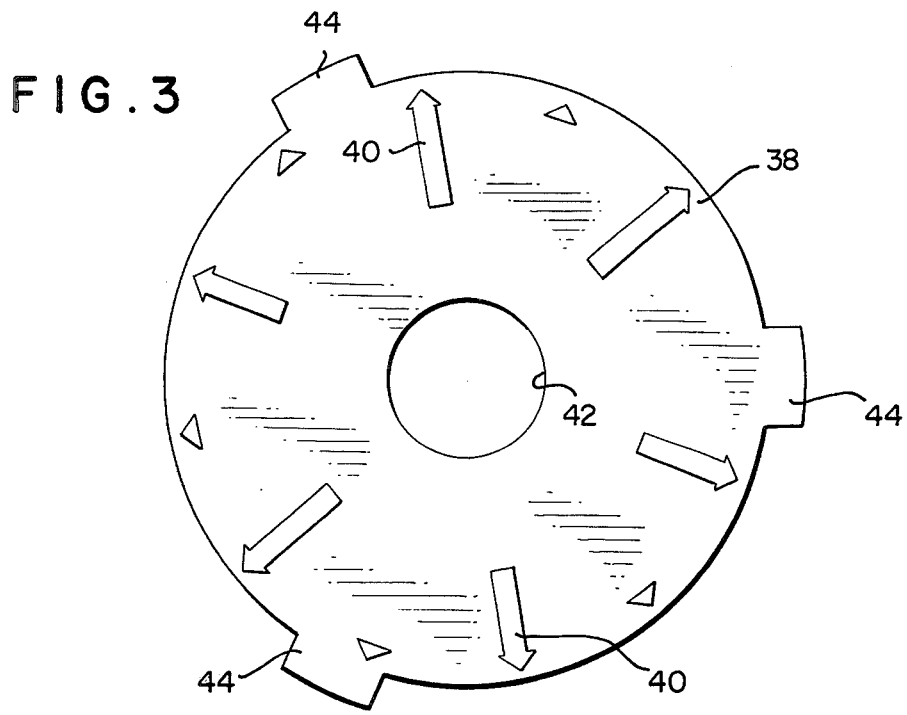
FIG. 3 is a plan view of the question card utilized with the rotary dial of FIG. 1.

Referring now to FIG. 3, there is shown a plan view of a circular question card of this invention which comprises the circular portion 38 upon which is printed questions to be answered by the user. A series of arrows 40 are cooperatively aligned with pointer 32 of FIG. 1 so that the user knows which question is being answered at each stop of the rotary dial 14. A center circular hole 42 is provided through which knurled knob 34 passes. Three projecting lugs or ears 44 project from the periphery of the circular card and are so spatially oriented with respect to each other that they are seated within slots or depressions 36 in only one relationship. Thus, any number of different cards can be used with different questions so long as the relationship of the projecting lugs 44 is known.

In operation, the card 38 is placed on the rotary dial 14 and the first question is then in opposing relationship with pointer 32. The user determines whether or not he believes the answer to be TRUE or FALSE and pushes a respective push-button 28 or 30, respectively. If the user decides the answer is TRUE, and his answer is correct, the RIGHT signal area 22 is lighted confirming that the user's choice was correct. If the user chooses an incorrect answer, then the WRONG lighted area 24 will be lit designating that the user has incorrectly chosen his answer and therefore indicating the corrected answer for him.

Figure 4:
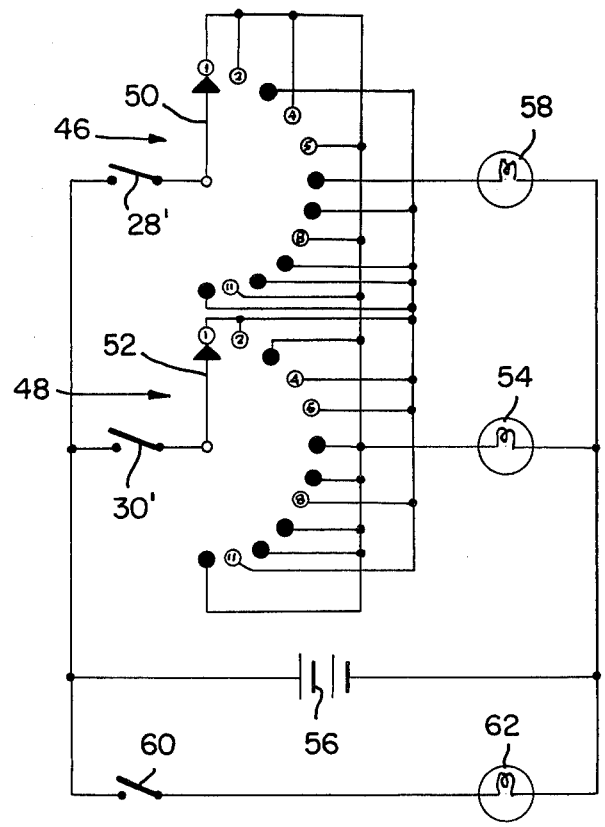
FIG. 4 is a schematic diagram of electric circuit means of this invention.

Referring now to FIG. 4, there is shown the wiring schematic diagram for enabling the rotary dial 14 to be prewired for TRUE and FALSE answers at specific positions along the rotary dial, independent of the questions on the question card 38 mounted on the dial 14. There are provided two twelve position rotary switches 46 and 48 each mounted on a common shaft movable with knurled handle 34 of FIG. 1. The switch wiper arms 50 and 52 respectively are ganged together such that when wiper arm 50 of switch 46 is at position 1 wiper arm 52 of rotary switch 48 is at position 1 also. Selected ones of the positions of the rotary switches are connected together in order to achieve the desired indicating effect of RIGHT and WRONG answers depending upon whether or not the TRUE or FALSE switch buttons are depressed. Thus, position 1 is connected in common with positions 2, 4, 5, 8 and 11 of switch 46 and in common with complementary set of positions 3, 6, 7, 9, 10 and 12 of switch 48 through WRONG indicator bulb 54, which is connected in series with a pair of batteries 56, which themselves are connected through switches 30' and 28' to the wiper arms 52 and 50 respectively. The primed numerals 30' and 28' are meant to designate the switches operated by push-buttons 30 and 28, respectively of FIG. 1. To illustrate the operation of the invention, assume that the rotary dial is in position 1 and that there is a question presented to the user. Assume the user depresses the TRUE button in answer to the question; an electrical path is then formed between wiper arm 50, contact 1, bulb 54, batteries 56 and switch 28' so as to illuminate bulb 54 indicating that the answer was not TRUE but FALSE. Thus, if the FALSE button 30 had been depressed such that switch 30' was closed, the RIGHT button 58 would have been illuminated, as described hereinafter. Positions 3, 6, 7, 9, 10 and 12 of switch 46 and 1, 2, 4, 5, 8 and 11 of switch 48 are all wired in common and through RIGHT illuminating bulb 58 through the batteries 56 to the switches 28' and 30'. If the user had selected the FALSE button 30 and depressed the same, then switch 30' would have been closed and a complete electrical path would be formed through position 1 of switch 48, bulb 58, battery 56 and switch 30' to illuminate the RIGHT bulb 58, thus indicating that the user's FALSE answer was correct. As can be realized, each of the switches is prewired to have a RIGHT or WRONG TRUE or FALSE answer. Thus, position 1 will always be FALSE as will positions 2, 4, 5, 8 and 11, while positions 3, 6, 7, 9, 10 and 12 will always be TRUE. If the user depresses the correct TRUE or FALSE button for the corresponding position, the corresponding RIGHT or WRONG bulbs 58 or 54, respectively will be illuminated accordingly The switches 46 and 48 are ganged together and may comprise a phenolic rotary switch with a no stop shaft so that the rotary switch can be continuously moved in any direction, thereby preventing the possibility that the user could determine the position in which the switch was presently located and in order to assist his figuring out the sequence of answers as applied to all cards.

A switch 60 is provided which is energized when the slide is placed within receptacle 26 causing bulb 62 to illuminate the object carried on the slide.

Figure 2:
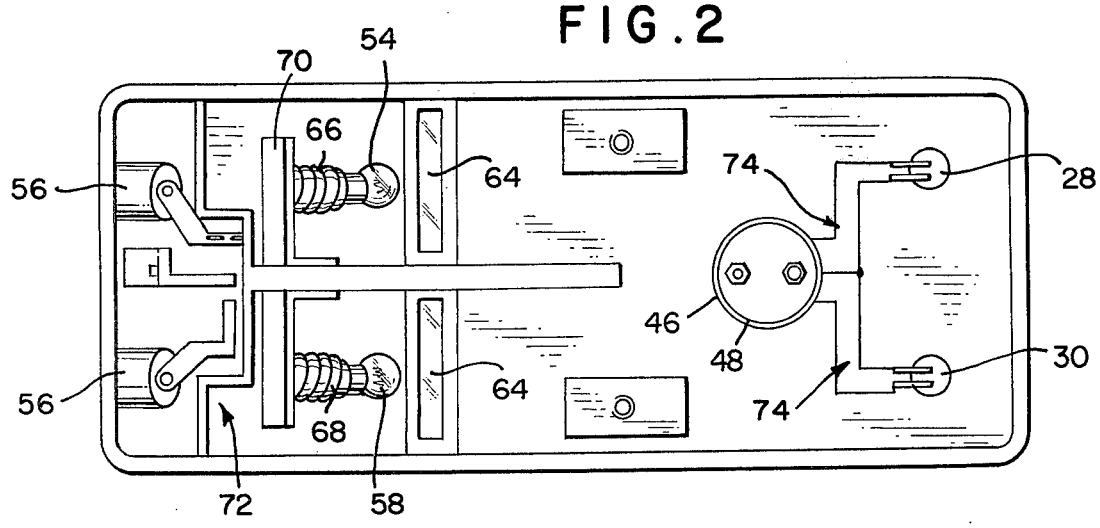
FIG. 2 is a bottom plan view of the inside of the housing of the machine of FIG. 1.

In accordance with the principals of this invention, the answering machine is constructed so as to be portable and susceptable of being used by children. Thus, there is a compact, convenient and durable construction, and FIG. 2 presents a bottom plan view of the insides of the machine of FIG. 1. There is shown in FIG. 2 support posts 64 to which is connected a bottom covering plate (not shown). There is also shown bulbs 54 and 58 being insertable in respective holders 66 and 68 respectively, the holders being connected to a support post 70. A battery holding assembly 72 is generally shown as indicated and the multiposition ganged rotary switches 46 and 48 are illustrated as being connected to and rotatable by dial 34, the switches being connected by wiring 74 to push-buttons 28 and 30 so as to cause the respective switches 28' and 30' to be closed when the corresponding push-buttons are depressed.

I claim:

1. A visual self-correcting answer machine in which questions are presented to a user and the user indicates whether the answer is TRUE or FALSE, there being provided means for indicating whether the user's answer is RIGHT or WRONG, said answer machine comprising a cabinet housing the components of said answer machine therewithin, a rotary dial plate mounted on said cabinet for receiving a circular question card containing questions printed thereon to be answered by the user, a question indicating area on said cabinet indicating the question to be answered, a pair of depressible switch means designating the choice of a TRUE or FALSE answer by the user, RIGHT and WRONG visual indications, electrical circuit means cooperatively keyed and connected to said rotary dial, to said pair of depressible switch means and to said visual indicators to indicate whether the user's answer of TRUE or FALSE was RIGHT or WRONG, wherein said rotary dial and said circular card comprises cooperating members enabling said card to be placed on said dial in only one spatial orientation wherein said electric circuit means comprises a rotary multiposition switch operated by said dial and having a plurality of positions corresponding to the number of questions on said card, said multiposition switch being wired to show whether an answer is TRUE or FALSE according to the position of said rotary multiposition switch, such that a plurality of different question cards can be used with said answer machine.

2. The answer machine of claim 1, wherein said cabinet further comprises a slide viewer window, said slide viewer window displaying an object to which the question on said circular question card relate, and switch means activated when a slide is placed in said slide viewer to illuminate the object on said slide to the user.

3. The answer machine of claim 2, wherein said cabinet comprises a sloped surface comprising said slide viewer window and said RIGHT and WRONG visual indicators.

4. The answer machine of claim 1, wherein said circular card comprises a plurality of ears extending from the perimeter of said card, said ears having a fixed spatial relation with respect to each other, said rotary dial having a corresponding cooperating plurality of depressions spatially related to each other for receiving said circular card in said one spatial relation.

5. The answer machine of claim 1, wherein said rotary multiposition comprises a freely rotatable shaft, such that the position of said rotary dial and shaft is unknown to the user.

6. The answer machine of claim 5, comprising battery means to power said machine, such that said machine is portable.

* * * * *